March 5, 1957  H. T. BUDENBOM  2,784,381
HYBRID RING COUPLING ARRANGEMENTS
Filed Oct. 5, 1948  4 Sheets-Sheet 1
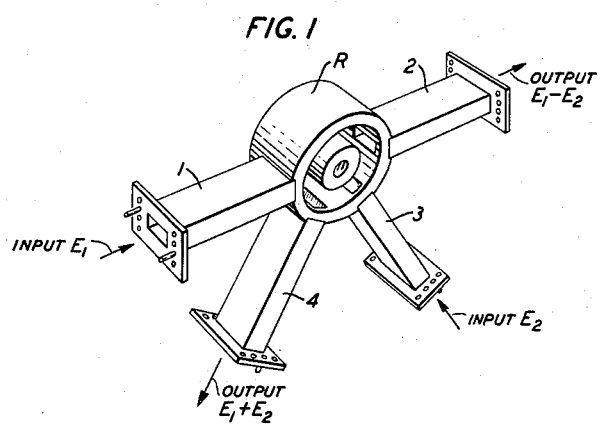
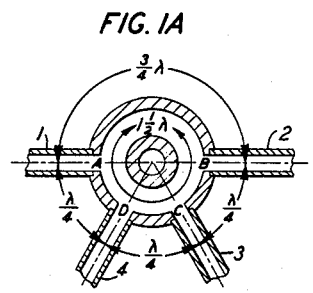
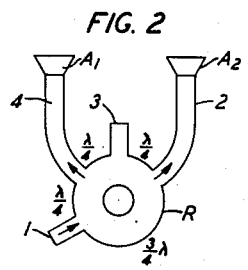
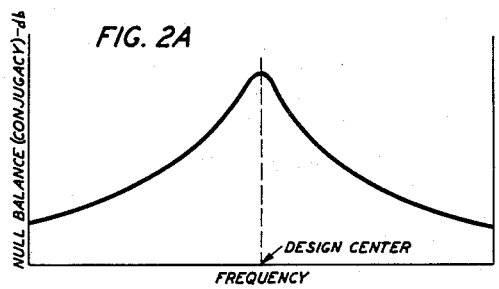
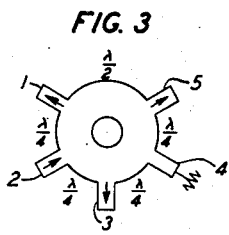
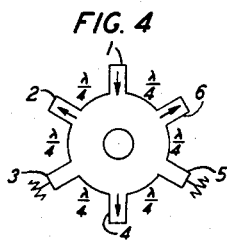
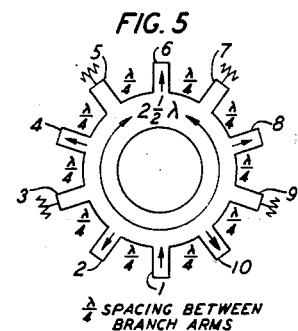
INVENTOR
H. T. BUDENBOM
BY Earl C. Laughlin
ATTORNEY March 5, 1957  H. T. BUDENBOM  2,784,381
HYBRID RING COUPLING ARRANGEMENTS
Filed Oct. 5, 1948  4 Sheets-Sheet 2
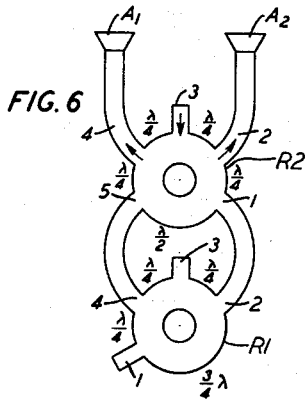
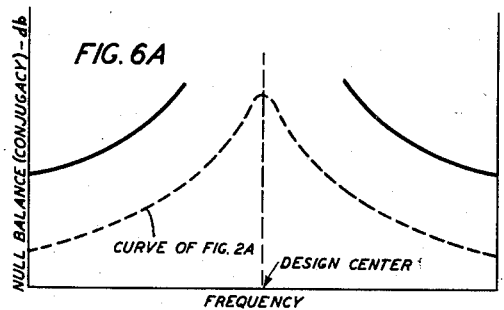
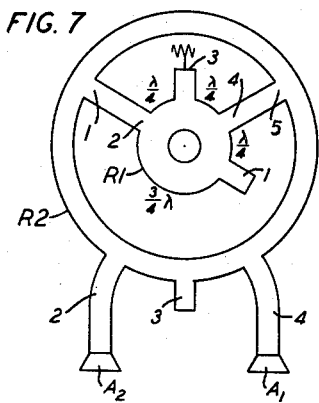
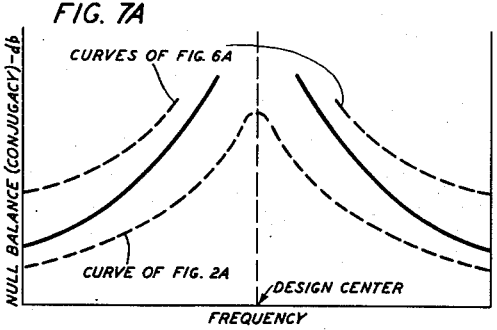
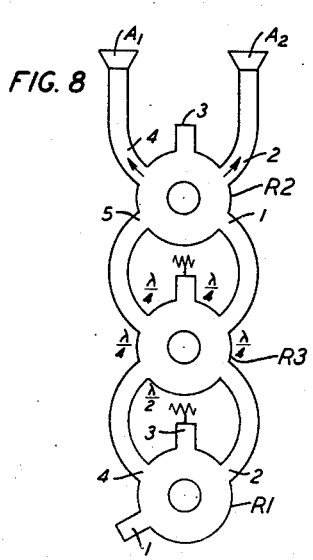
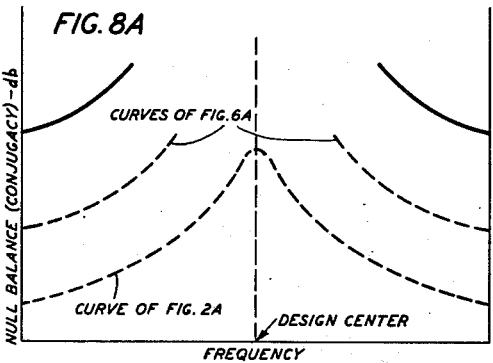
INVENTOR
H. T. BUDENBOM
BY Earl C. Laughlin
ATTORNEY March 5, 1957  H. T. BUDENBOM  2,784,381
HYBRID RING COUPLING ARRANGEMENTS
Filed Oct. 5, 1948  4 Sheets-Sheet 3

SPACING nλ BETWEEN TAPS

INVENTOR
H. T. BUDENBOM
BY Earl C. Laughlin
ATTORNEY

United States Patent Office

2,784,381
Patented Mar. 5, 1957

2,784,381

HYBRID RING COUPLING ARRANGEMENTS

Horace T. Budenbom, Short Hills, N. J., assignor to Bell Telephone Laboratories, Incorporated, New York, N. Y., a corporation of New York Application October 5, 1948, Serial No. 52,856

14 Claims. (Cl. 333—11)

The invention relates to wave transmission systems and particularly to wave balancing and power dividing arrangements for use in such systems.

In radio and other high frequency signaling and control systems, it is often desirable to distribute high frequency wave power supplied from a single source between a plurality of receiving channels or loads while maintaining a high degree of isolation or conjugacy between the individual channels or loads so as to prevent interfering effects. A number of different types of coupling networks for this purpose having bridge or null balance characteristics analogous to those of the hybrid coil commonly used in voice frequency communication practice, which are particularly adapted for use in ultra-high frequency systems, are disclosed in the United States Patent Number 2,445,-895, issued July 27, 1948, and are further described in the article, "Hybrid circuits for microwaves," by W. A. Tyrrell, published in the November 1947 issue of the Proceedings of the I. R. E. One described type of structure for this purpose, referred to as a "hybrid ring," comprises a section of dielectric wave guide, coaxial cable, or other type of transmission line, formed into a closed transmission loop or ring an odd number of half-wavelengths in mean perimeter and four series or shunt branching connections or taps to the loop at appropriately spaced points. In one form of hybrid ring disclosed, the four branch taps are connected in series electrically with the loop (which for a wave guide ring is a connection in the electric plane), and the electrical spacings between the branch taps are selected so as to provide two paths around the loop between each two oppositely situated (non-adjacent) branch taps differing in effective electrical length by a half-wavelength at the design frequency. If electromagnetic waves of that frequency are applied to the loop through any one of the four branch taps, the two portions thereof transmitted over the two sides of the loop in opposite directions will be of opposite phase at the point of connection of the oppositely situated branch tap, which results in a voltage maximum (or current minimum) at that point, and will be of the same phase at the points of connection of the two intermediate branch taps to the loop, which results in a voltage minimum (or current maximum) at these points due to the fact that the effective electrical lengths of the two paths traversed by the two wave portions in reaching the letter points are either equal or different by an integral number of wavelengths. Because of the series connections, the branch tap connected at the voltage maximum point will receive substantially no power, whereas the two intermediate branch taps at voltage minimum points will each receive part of the wave power applied to the loop and, if each of the taps is terminated in its characteristic impedance, each of the taps at a voltage minimum point will receive half the input power. One known use of this type of hybrid ring is to provide as outputs from two oppositely situated (non-adjacent) branch taps, the sum and difference, respectively, of two input voltages of the same frequency respectively applied to the loop through a different one of the other two oppositely situated branch taps. For the case of sum and difference action, the hybrid ring has an advantage when the power level is high over the wave guide hybrid junction (particular orthogonal junction of four rectangular wave guides), also disclosed in the aforementioned Tyrrell patent, since it has been found considerably less susceptible to voltage breakdown. For power division the hybrid ring has the advantage of higher power capability and, for some applications, of greater simplicity.

One object of the invention is to adapt a hybrid ring of the above-described general type for dividing wave power supplied thereto from a single source between a greater number, more than two, of receiving channels or loads, while maintaining a high degree of isolation (conjugacy) between some or all of the individual channels or loads. This is accomplished by increasing the number of series branch taps to the loop to five or more with electrical spacings between them such as to provide a good null balance between each branch tap and one or more of the other branch taps, connecting the source of wave power to one of the branch taps, iteratively terminating the branch tap or taps which are balanced with respect to said one tap, and connecting each of the receiving channels or loads to a different one of the branch taps which are unbalanced with respect to the branch tap to which the source of wave power is connected.

Another object is to increase the frequency range or band over which a useful balance or conjugacy may be obtained between two or more lines or circuits in a wave transmission network by the use of hybrid ring structures. This is accomplished by connecting a hybrid ring having a given number of branch taps or arms in tandem with two or more hybrid rings having a greater number of branch arms or taps in such manner as to nearly add logarithmically the attenuations obtainable between conjugate taps or arms of the several hybrid ring structures. In one embodiment of this species of the invention, the coupling arrangement between the source of power and the receiving channels or loads between which the power is to be divided with conjugacy between them comprises a four-arm hybrid ring in tandem with one, two or more five-arm hybrid rings. A feature of the invention is a power dividing device comprising a concentric arrangement of a four-arm hybrid ring and a five-arm hybrid ring coupled in tandem, the mean perimeter of the outer five-arm hybrid ring being expanded in an odd integral ratio with respect to the mean perimeter of the inner four-arm hybrid ring so as to enable straight cross-connections to be made between the arms of the two tandem-connected rings.

The various objects and features of the invention will be better understood from the following detailed description when read in conjunction with the accompanying drawings in which:

Figs. 1 and 1A, respectively, show a perspective and a cross-sectional view of a four-arm wave-guide hybrid ring known in the prior art;

Figs. 2 and 2A show diagrammatically the application of a four-arm hybrid ring structure of the type illustrated in Figs. 1 and 1A for power division in a radio system, and a curve showing how the null balance in this structure is effected by changes in frequency, respectively;

Figs. 3, 4 and 5 show diagrammatically a five-arm, a six-arm and a ten-arm hybrid ring, respectively, embodying the invention used for obtaining power division with conjugacy;

Figs. 6, 7 and 8 show diagrammatically null balance arrangements in accordance with the invention employing two or more hybrid rings in tandem, and Figs. 6A, 7A and 8A show curves comparing the performance of these hybrid ring structures with single hybrid ring and other tandem structures;

Figure 12:
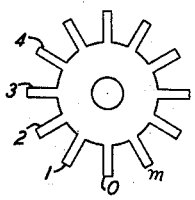
Figure 14A:
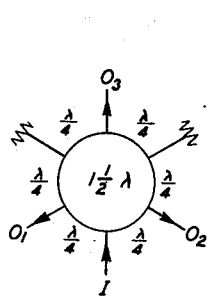
Figure 14B:
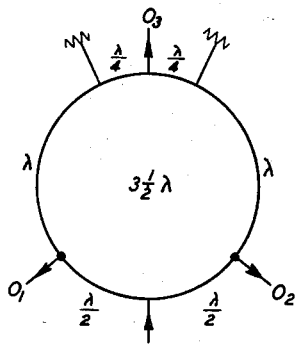
Figure 14C:
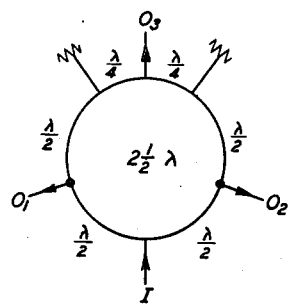

Fig. 12 shows diagrammatically a multitap hydrid ring structure in accordance with the invention employing a different spacing between taps than those of Figs. 3 to 8; and Figs. 14A, 14B and 14C show diagrammatically how a multitap hybrid ring arrangement having all series type connections of the taps to the ring is converted to a hybrid ring arrangement employing both series and shunt type connections of the taps to the ring.

Reference will first be made to Figs. 1 and 1A showing one specific embodiment of the general type of hybrid ring structure to which the invention applies. In this embodiment, as shown, the hybrid ring comprises a section of hollow pipe wave guide of rectangular cross section, formed into a continuous ring or annulus R one and one-half wavelengths $\lambda$ in means circumference with four wave-guide connections 1, 2, 3 and 4 thereto, connected as branches symmetrically to the wave-guide ring R at the points A, B, C and D, respectively, in the electric or E-plane which corresponds to a series electrical connection. The wave-guide branches 1 to 4 may be of the usual variety comprising hollow pipe of rectangular cross section in which the electric or E-plane transverse dimension is about half the other (magnetic or H-plane) transverse dimension. Also, the height of the ring or annulus R in this particular embodiment may be equal to the H-plane dimension of the wave-guide and its width such as to provide an impedance match (on the $\sqrt{2}$ basis as taught in the aforementioned Tyrrell patent). The ring and branches of the general type of hybrid ring structure to which the invention is applicable may comprise other types of wave-guide construction, coaxials or wires, and loop shapes other than circular may be used. Also, the connections of the several branches to the ring or annulus may be in the magnetic or H-plane, equivalent to a shunt or parallel electrical connection, as also taught in the aforementioned Tyrrell patent.

As indicated in Fig. 1A, the effective electrical lengths of the paths around the ring between the branch arm 2 and the branch arm 3, between the branch arm 3 and the branch arm 4, and between the branch arm 4 and the branch arm 1 are each equal to a quarter-wavelength; and the effective electrical length of the path around the ring between the branch arm 1 and the branch arm 2 is three quarter-wavelengths. These spacings provide two electrical paths around the ring between each branch arm and the oppositely situated (non-adjacent) branch arms differing in electrical length by a half-wavelength. If a wave input $E_1$ is applied to the wave-guide ring R through the branch arm 1 and a second input wave $E_2$ of the same frequency is applied to the ring through branch arm 3, the sum of the two input powers, $E_1+E_2$, will appear as an output in the branch arm 4 since the path lengths from each input to the output between them are equal; and the difference of the two input powers $E_1-E_2$, will appear as an output in the branch arm 2 since the path lengths from each input to the remaining output differ by one-half wavelength. With proper design and terminations for the branch arms, the four-arm hybrid ring structure shown exhibits these additional properties; the branch arms 1 and 3 are conjugate (a high transmission loss obtains between them); the sum and difference branch arms 4 and 2 are conjugate; a single input to the ring through branch arm 4 will divide equally, half the input power appearing in branch arm 1 and half in branch arm 3; a single input to the ring through branch arm 2 will divide equally, half the input power appearing in branch arm 1 and half in branch arm 3; and a single input to the ring through branch arm 1 or 3 will be divided equally between the branch arms 4 and 2. However, if the branch arm 2 were removed, the power input through branch arm 4 would still divide between branch arms 1 and 3, but the branch arms 1 and 3 will no longer remain conjugate.

Fig. 2 shows a four-arm wave-guide hybrid ring of the type of Figs. 1 and 1A used to provide two-way power division with conjugacy in a radio system between a pair of horn antennas $A_1$ and $A_2$ respectively connected to the branch arms 4 and 2. If input power is applied to the ring through one branch arm, say arm 1, and the opposite branch arm 3 is properly terminated, the output power will be divided between the branch arms 2 and 4 leading to the antennas $A_2$ and $A_1$, respectively, but the balance between the two pairs of oppositely situated branch arms will be frequency sensitive. As shown, by the curve of Fig. 2A, the null balance (conjugacy) is quite good in the immediate vicinity of the design center frequency where the means perimeter of the ring is near one and one-half wavelengths in the guide. On either side of the peak, however, as shown, the null balance depreciates, in a manner similar to that of the response of a resonant circuit for applied frequencies on either side of the resonant frequency. While the balance of interest is that with respect to the two antenna branch arms 2 and 4, it is equivalent to measure the balance between the arms 1 and 3, which is the usual laboratory procedure.

Fig. 3 shows the use of a five-arm $1\frac{1}{2}\lambda$ wave-guide hybrid ring with series connections of the arms to the closed loop or ring in accordance with the invention as a three-way power divider. The electrical spacing around the ring between branch arms 1 and 2, between branch arms 2 and 3, between branch arms 3 and 4, and between arms 4 and 5 is $\frac{1}{4}\lambda$ each, and that between branch arms 1 and 5 is $\frac{1}{2}\lambda$. With an input applied to arm 2 and arm 4 iteratively terminated as shown diagrammatically the output of branch arm 3 will be effectively isolated (conjugate) from the output at arms 1 and 5, but arms 1 and 5 will not be isolated. For one experimental sample, the levels at the three outputs were measured to be as follows, relative to the input level: at branches 1 and 5, 8 decibels each as compared to 5 decibels at output 3.

Fig. 4 shows the use of a six-arm $1\frac{1}{2}\lambda$ wave-guide hybrid ring with series connections of the arms to the ring in accordance with the invention as a three-way power divider. An electrical spacing of $\frac{1}{4}\lambda$ is used between each two adjacent arms of the six arms. With a wave input applied to the ring through branch arm 1 and with branch arms 3 and 5 iteratively terminated, wave outputs will appear at branch arms 2, 4 and 6 and all of these are isolated with respect to each other. In a measured sample, the levels at the three output points relative to that at branch arm 1 were: at branch arms 2 and 6, 4.5 decibels as compared to about 8.5 decibels at branch arm 4.

Fig. 5 shows a ten-arm $2\frac{1}{2}\lambda$ wave-guide hybrid ring with series connections of the arms to the ring in accordance with the invention adapted for providing power division between five loads with a high degree of isolation between them. As indicated, each two adjacent branch arms of the wave guide hybrid ring are electrically spaced from each other by $\frac{1}{4}\lambda$. With wave power applied to the ring through branch arm 1, and with the alternate branch arms 3, 5, 7, and 9 iteratively terminated, the output wave power will be divided between the five branching arms 2, 4, 6, 8, and 10 with a high degree of isolation between the individual output branches. One experimental sample of such a structure showed the following output levels compared to an input level of one decibel at branch 1: at branch arms 2 and 10, 5.4 decibels; at branch arms 4 and 8, 11.6 decibels; and at branch arm 6, 14.4 decibels.

Obviously, the power dividing arrangements of Figs. 3 to 5 are not limited by hybrid rings of 1½λ in mean perimeter, but may be expanded in the manner taught by Tyrrell in the aforementioned I. R. E. article of November, 1947, without altering any of the circuit characteristics, by the application of either or both of the following rules:

(a) An integral number of wavelengths may be added to or subtracted from any arc (portion of ring between center lines of adjacent branch arms);

(b) A pair of half-wavelengths may be added to or subtracted from any two arcs.

The frequency band over which a useful balance (of the order of 35–40 decibels minimum) may be obtained with hybrid rings can be broadened in accordance with the invention by the use of the structure shown in Fig. 6. This structure comprises a pair of 1½λ wave guide hybrid rings R1 and R2 connected in tandem. The lower ring R1 may be identical with the four-arm hybrid ring of Fig. 2, and the upper ring R2 identical with the five-arm hybrid ring of Fig. 3, the electrical spacings between the similarly numbered branch arms of the two rings being the same as shown in Figs. 2 and 3, respectively. The two branch arms 5 and 1 of the upper five-arm ring R2 separated by a half-wavelength are connected directly to the two branch arms 4 and 2, respectively, of the lower four-arm ring also separated by a half-wavelength as shown. The branch arms 2 and 4 of the upper five-arm ring R2 are connected to the horn-type antennas $A_2$ and $A_1$, respectively. The branch arm 3 of the lower four-arm ring R1 is terminated iteratively.

When the conjugacy between the branch arm 3 of the upper ring and the branch arm 1 of the tandem arrangement of Fig. 6 is measured, it is found to be much improved over that obtainable with a four-arm hybrid ring or the five-arm hybrid ring used alone. The resulting null balance-frequency characteristic for the tandem-ring arrangement of Fig. 6 is shown by the solid-line curves of Fig. 6A, with the corresponding characteristic for the four-arm hybrid ring R1 of Fig. 3 shown by the dotted curve for comparison. The reason for the improvement may be discussed in terms of conjugacy for a single wave input to the arrangement of Fig. 6 at the branch arm 3 of the upper ring. At the design frequency, the outputs 5 and 1 of the upper five-arm ring are conjugate with respect to such an input. As the frequency is shifted from the design center, the voltages which will begin to appear in the branch arms 5 and 1 of the five-arm ring are oppositely phased due to the half-wave separation between these branches. The outputs of the two branch arms 5 and 1 of the five-arm ring are supplied to the four-arm ring through branch arms 4 and 2 of the latter ring and are combined therein in differential fashion so as to provide a sort of first order cancellation of frequency sensitivity of the conjugacy thus effectively increasing the frequency band over which a useful balance can be obtained.

Tests of the tandem four-arm and five-arm hybrid ring arrangement of Fig. 6 show that a null balance of the order of 35 to 40 decibels or better was attained over a frequency range from 3.13 to 3.53 centimeters wavelength. In the particular arrangement built and tested, the cross section of the rectangular wave guide used was .900 x .400 inch, inside measurement. The rings were machined brass blocks. Each block was split in a plane perpendicular to the ring axis at the mid-point of the broad guide dimension.

The tandem arrangement of Fig. 6 is not limited to the particular ring dimensions shown, 1½λ mean perimeter, for each ring but the dimensions of each ring may be expanded in the manner taught by Tyrrell in the aforementioned I. R. E. article by the appropriate addition of half or full wavelength sections.

Fig. 7 shows a modified tandem arrangement of a four-arm and a five-arm hybrid ring in which the perimeter of the five-arm ring is expanded in an odd integral manner (as 3, 5, 7, 9 ... ×1½λ) such that the four-arm ring may be built internal to the five-arm ring and thus enable straight cross-connections to be made between the connecting arms of the two rings. The conjugacy obtained by this concentric hybrid ring structure loses somewhat in band width with the larger perimeter, the band width over which conjugacy will be attained being intermediate between that obtainable for the hybrid ring structures of Figs. 2 and 6, as indicated by the relative performance curves of Fig. 7A.

It appears that, subject to practical leakage limitations, the degree of conjugacy can be increased indefinitely by the addition of other hybrid rings to the tandem structure. Fig. 8 shows the tandem combination of a four-arm hybrid ring R1 and two five-arm hybrid rings R2 and R3 each having a mean perimeter of 1½λ. Two of the branch arms of the central five-arm hybrid ring R3 which are separated by a half-wavelength are connected to two of the branch arms also separated by a half-wavelength of the end five-arm ring R2, and the other two branch arms of the central five-arm ring separated by a half-wavelength are connected to the two branch arms 4 and 2 of the four-arm ring R1 separated by a half-wavelength. The remaining arm of the central five-arm hybrid ring R3 and the arm 3 of the four-arm ring R1 are terminated iteratively. As shown by the conjugacy curves of Fig. 8A, the performance of the tandem hybrid ring structure of Fig. 8 (see solid line curves) relative to the hybrid ring structures of Figs. 2 and 6 (see dotted curves) as regards the frequency band over which conjugacy is obtained has been further improved. If a plot of conjugacy in decibels is made against the logarithm of the percent departure of frequency from the design center, it will be found that over a considerable percentage interval, the slopes of the conjugacy characteristics are nearly as follows: one hybrid ring —6 decibels per octave; two hybrid rings —12 decibels per octave; and three hybrid rings —18 decibels per octave. In the structures of Figs. 6, 7 and 8, it was found that the addition of hybrid rings in tandem did not affect materially at the design center frequency either the division of power between branch arms 2 and 4 for an input branch arm 3 in the five-arm hybrid ring R2 or the degree of conjugacy between branch arms 2 and 4. The individual rings of the tandem ring structures may be expanded in perimeter in the manner taught by the aforementioned Tyrrell patent.

For the case of the five-arm 1½λ hybrid ring structure of Fig. 3, all output levels could be nearly equalized, and one extra isolated output gained, by connecting a four-arm hybrid ring such as shown in Figs. 1 and 1A or Fig. 2 to arm 3. For the six-arm 1½λ hybrid ring of Fig. 4, two added isolated outputs could be obtained, and all outputs nearly equalized, by connecting a four-arm hybrid ring to each of the arms 2 and 6.

Figure 9:
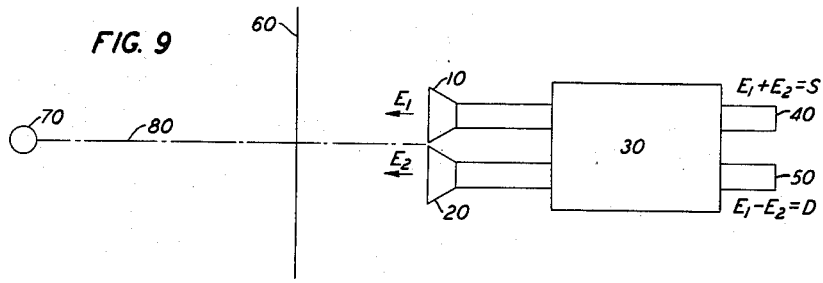
Figs. 9, 10, 11 and 13 illustrate diagrammatically applications of the power dividing and null balance arrangements of the invention to various radar and other ultra-high frequency radio systems.
Figure 9A:
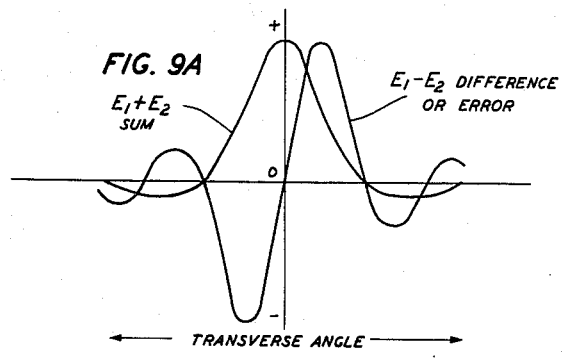
Fig. 9A shows curves illustrating the operation of a hybrid ring power dividing arrangement in accordance with the invention in the radar system of Fig. 9.

The hybrid ring arrangements of the invention are particularly applicable for providing the desired division of power with conjugacy in radar systems in which it is desired to measure accurately the sum and difference of two input voltages. An example of this is a monopulse system for angle tracking of moving targets in which complete (two) directional determinations of the arrival angle of the radar wave is obtained within the period of one individual echo pulse by a differential amplitude method. The component elements of such a system and their initial operation for one angle coordinate are illustrated in Figs. 9 and 9A. As shown in Fig. 9, in such a structure a pair of horn antennas 10 and 20 are arranged to feed a lens antenna 60, and the electrical signals (echoes) $E_1$ and $E_2$, respectively received by the antennas 10 and 20 are fed to a power dividing arrangement 30 which may be a hybrid ring structure in accordance with the invention, such as is illustrated in Figs. 3, 6, 7, or 8, which is capable of producing the sum, $E_1+E_2$, of these two input voltages at one output terminal 40 and their difference, $E_1-E_2$, at another output terminal 50. The antenna-power dividing arrangement assembly is arranged to be traversed (rotated) so that the antenna scans a region in which a target 70 is moving. For present purposes, the target 70 may be assumed to be an active source (as in beacon tracking), although in other radar applications the target will be passive; in the latter case, during the period of a transmitted pulse the target 70 is illuminated by high level transmitter power applied at terminal 40 of the power dividing network 30 and divided by that network into two portions which are radiated by the horn antennas 10 and 20, respectively. When the antenna assembly traverses to a position along the indicated axis line 80, equal voltages will be induced into the horn antennas 10 and 20 by the wave energy arriving from the target 70 and focused by the lens 60; in this event, no energy will appear at the output terminal 50 of the hybrid structure 30, assuming the hybrid and associated wave guide structures to be perfect. As soon however, as the assembly traverses off the axis of symmetry 80, the voltages $E_1$ and $E_2$ will cease to be equal, one or the other predominating in amplitude according to the direction of traverse. Accordingly, a difference component, $E_1-E_2$, will appear at the terminal 50.

The behavior of the radio frequency voltages as the antenna assembly traverses is indicated by the curves of Fig. 9A. The slope of the difference $(E_1-E_2)$ curve is actually quite steep and is approximately linear in the cross-over region (traverse angle=0).

Conditions often arise in radar design where it is advantageous to supply microwave power to several loads. In certain of these cases, it is also necessary that the loads remain mutually conjugate. As an example of the latter case, there is the problem of beating oscillator supply to the several channels of a monopulse tracking system the operation of which for one angle coordinate has already been described in connection with Figs. 9 and 9A. Operation in both angle coordinates requires a common beating oscillator supply to a sum channel such as has already been referred to in connection with Figs. 9 and 9A and, in addition, two error signal channels, i. e., an azimuth error signal and an elevation error signal channel. All three channels must be mutually conjugate to prevent interchannel cross-talk via the beating oscillator.

Figure 10:
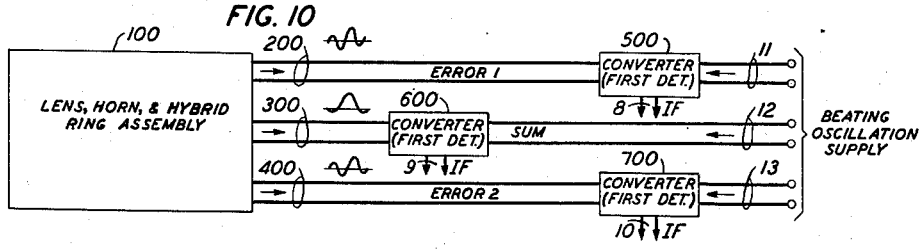

Fig. 10 illustrates diagrammatically how a hybrid ring arrangement in accordance with the invention could be utilized for the latter purpose. The lens-feed horn-power divider (hybrid ring) assembly is generically denoted by the box 100 in the figure, from which extend three channel outputs 200, 300 and 400 for the error 1, sum and error 2 signals, respectively. These outputs are fed to converters (first detectors) 500, 600, 700 to which a single beating oscillator supplies through separate leads 11, 12 and 13, respectively, oscillations to beat in the respective converters with the supplied error 1, sum and error 2 signals, respectively, to produce the separate intermediate frequency signals I. F. to exit at the terminals 8, 9 and 10 of the respective converters. In addition, in such a system, other drains on the beating oscillator may exist. For example, a supply for a converter or converters for automatic frequency control is usually needed. The hybrid ring power dividing arrangements in accordance with the invention as shown in Figs. 3, 4, 5, 6, 7 and 8 are suitable for use in such a system for providing the high degree of conjugacy over the desired frequency band required between the three or more receiving channels in such a system.

Figure 11:
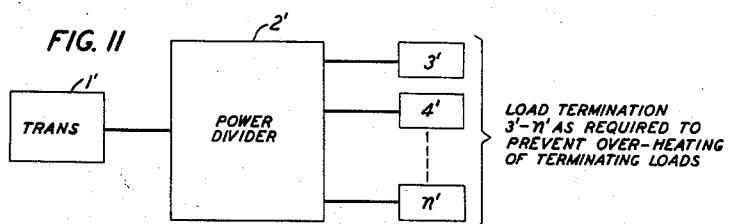

Another application for the hybrid ring arrangements in accordance with the invention is to terminations for high power radar transmitters as illustrated diagrammatically in Fig. 11. In such cases, while conjugacy may not be requisite, the use of power division may be most advantageous to prevent overheating of the wave-guide terminations (iterative). Furthermore, the use of the hybrid ring structures of the invention for such division may be desirable owing to their superior power handling capabilities. In the arrangement of Fig. 11, the numeral 1' designates a transmitter, such as a magnetron, 2' a power divider for dividing the power from the transmitter into the required number of wave portions, and 3', 4' ... n' separate load terminations.

Fig. 12 illustrates diagrammatically a multi-tap hybrid ring structure in accordance with the invention suitable for use for multiple operation of microwave transmitters. Since a section of wave guide of length $n\lambda$ can be shown, neglecting dissipation, to be equivalent to a strap, a hybrid ring of $m$ taps, spaced by $n\lambda$, as shown, may be used for the series connectors of the transmitters. $M+1$ taps would be required for $m$ transmitters in order to provide one tap for an output connection O.

Figure 13:
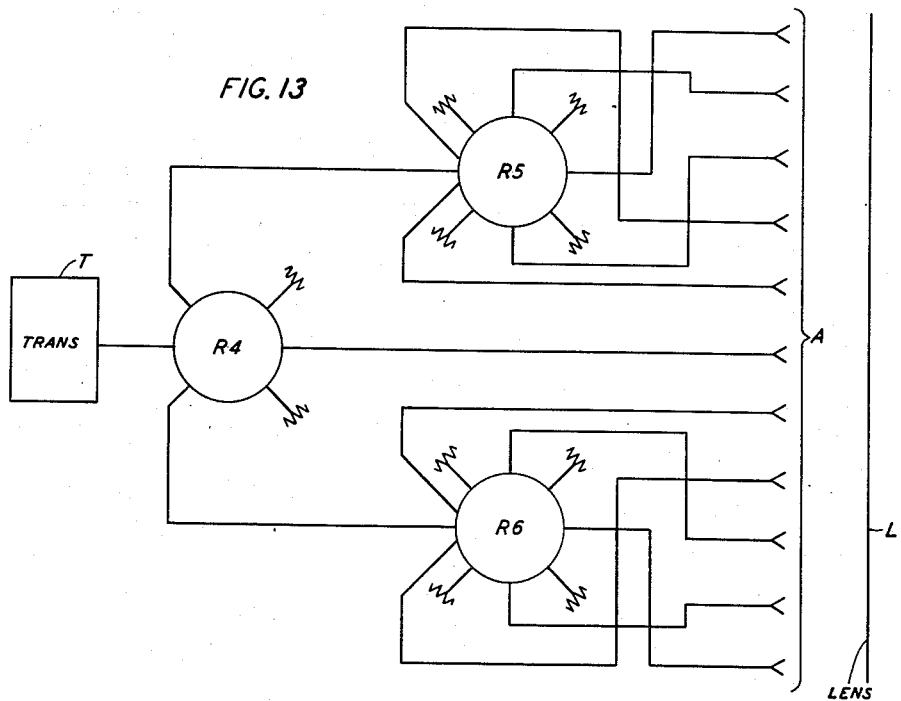

A further application of power division by the hybrid ring arrangements of the invention is in connection with antenna feeds having specified power distribution. Thus, an antenna aperture fed uniformly across its dimension has good gain but excessive side lobes, whereas the side lobes can be very markedly reduced, with only minor gain reduction, by tapering the feed to 10 decibels down or more at the edges of the aperture. Again, special feed distributions are useful in achieving the well-known "cosecant squared" type of pattern. From the description given above, it should be clear that combinations of the power dividing hybrid structures in accordance with the invention should enable division of the high power supplied by a transmitter, such as a magnetron or other transmitting oscillator, into a feed horn array so that the illumination of the antenna aperture will vary in almost any desired manner. Fig. 13 illustrates this general application. It is desired, in order to reduce side lobes, to taper the illumination of the lens L at the edges. Accordingly, the power of the transmitter T is divided by a hybrid ring array in accordance with the invention comprising the tandem connected hybrid rings R4, R5 and R6, illustrated diagrammatically, each power outlet of which terminates in one of the small horn antennas A. In the illustration, which is in no way intended to be restricted to any particular details of the component elements, the power of transmitter T is split three ways in the six-arm 1½λ hybrid ring R4, two arms of which are terminated iteratively as shown. One outlet from hybrid ring R4 carrying the least power supplies the central one of the feed horn antennas A directly. The two other power outlets of hybrid ring R4 respectively feed into one arm of one of the ten-arm 2½λ power divider hybrid rings R5 and R6 in accordance with the invention. The two outlets of least power from rings R5 and R6 feed the horns A illuminating the edges of the lens L. The two power outlets of next higher power level from each of the rings R5 and R6 feed certain of the horn antennas A nearer the center of the lens L, and those outlets of highest power level from each ring R5 and R6 feed certain of the horn antennas A still nearer the central portion of the lens L. Thus a tapered illumination is built up.

Figs. 14A, 14B and 14C show diagrammatically specific illustrations of the conversion of an all series type hybrid ring in accordance with the invention to a hybrid ring employing both series and shunt connections of the taps to the ring. Fig. 14A illustrates diagrammatically a six-arm 1½λ hybrid ring employing series connections of all six arms. In Fig. 14B the Tyrrell rule last quoted above has been applied to produce a six-arm 3½λ hybrid ring in which two of the output arms $O_1$ and $O_2$ are joined to the ring by shunt connections and the other four arms by series connections, and in Fig. 14C the first-mentioned two Tyrrell rules have been applied to reduce the mean perimeter from the three and one-half wavelengths of Fig. 14B to two and one-half wavelengths while maintaining the two shunt-connected arms and the four series-connected arms. The shunt connections of certain of the arms or taps to the ring in the hybrid ring arrangements of Figs. 14B and 14C have been indicated diagrammatically in these figures by a dot at the point of connection. The connections of the other arms or taps to the ring in these figures not having a dot at the point of connection are series connections. The wavelength spacings required in each case are shown on the three figures.

Other modifications of the five or more arm hybrid ring structures and tandem hybrid ring structures illustrated and described which are in the spirit and scope of the invention will occur to persons skilled in the art.

As stated previously, the invention is not limited to the use of air or other dielectric wave guide in the ring and branching arms of the hybrid structures illustrated and described, as coaxial cable, parallel wire lines or other types of lines, or combinations of wave guide and other types of lines may be employed. Also, shunt connections of the branches to the ring or loop may be employed in place of the series connections. The design of such structure employing shunt connections to accomplish the above-mentioned objects of the invention will be obvious to persons skilled in the art by application of the above-mentioned two rules taken from the aforementioned Tyrrell article and the additional rule recited therein: "If a series element of impedance Z on a transmission line of characteristic impedance $K_0$ is replaced by a shunt element of impedance $K_0^2/Z$, on one side of which is added a quarter-wavelength of line and on the other side a three-quarter wavelength of line, the entire performance of the circuit is unaltered."

What is claimed is:

1. A device for connecting three or more transmission circuits in wave transmission relation with respect to a source of power of given frequency while maintaining at least some of said circuits effectively isolated from each other, comprising a closed transmission loop having an effective electrical length of an odd number of half-wavelengths of said frequency multiplied by three or a higher odd integer and five or more branch connections to said loop at successive points spaced apart by a quarter-wavelength of said frequency or integral multiples thereof, said source of power being connected to said loop through one of said branch connections, one or more of the other branch connections at maximum voltage points in said loop being iteratively terminated and said three or more branch circuits being respectively connected to said loop through different ones of the remaining branch connections located at minimum voltage points therein.

2. A device for connecting three or more transmission circuits in transmission relationship with respect to a source of waves of given frequency and at least some of said circuits in conjugate relationship with respect to each other comprising a continuous loop transmission path having an effective electrical length of an odd number of half-wavelengths of said frequency multiplied by three or a higher odd integer and five or more series branch connections to said loop path at successive points which are separated effectively by a quarter-wavelength of said frequency, said source of waves being connected to said loop path through one of said branch connections, each branch connection so located in said loop path as to be effectively in conjugate relation with said one branch connection being iteratively terminated and each of said circuits being connected to said loop path through a different one of the other branch connections.

3. A device for producing division of wave power of a given frequency supplied from a single source between three loads with isolation between certain of them, comprising a section of transmission line formed into a continuous transmission loop having an effective electrical length of one and one-half wavelengths of said given frequency and five branch arms connected in series electrically with said loop at successive points therein separated effectively by a quarter-wavelength of said frequency, said source of wave power being connected to one of said branch arms, another of said branch arms separated from said one branch arm by two paths around said loop differing in effective electrical length by a half-wavelength of said given frequency being terminated in its characteristic impedance, and the three loads being respectively connected to a different one of the three remaining arms.

4. A device for supplying wave power of given frequency from a single source to three or more loads while maintaining said loads effectively isolated from each other comprising a continuous looped transmission path having an effective electrical length of an odd number of half-wavelengths of said frequency multiplied by three or a greater odd integer, six or more series branch arms to said looped path at successive points therein effectively separated by a quarter-wavelength of said frequency, said source of waves being connected to one of said arms, the two or more of the other branch arms so located as to be effectively in conjugate relationship with said one arm being terminated iteratively and each of said loads being connected to a different one of the remaining branch arms which are so located as to be unbalanced with respect to said one branch arm.

5. A device for dividing wave power of a given frequency supplied from a single source between three different load circuits while maintaining said load circuits effectively isolated from each other comprising a section of transmission line formed into a continuous transmission loop having a mean perimeter effectively equal to one and one-half wavelengths of said frequency and six series branching connections to said loop at successive points therein separated by a quarter-wavelength of said frequency, said source of wave power being connected to said loop through one of said branching connections, two others of said branching connections separated by two loop portions differing in electrical length by a half-wavelength being terminated in their characteristic impedances and said three load circuits being respectively connected to said loop through a different one of the three remaining branching connections.

6. A network for supplying wave energy of given frequency from a common source to five loads while effectively isolating said loads from each other, comprising a section of transmission line formed into a continuous loop having an effective electrical length of five half-wavelengths of said frequency and ten series branching connections to said loop at successive points therein separated by a loop portion of a quarter-wavelength of said frequency, said source being connected to one of said branching connections, each of four other branching connections separated from said one connection by loop portions of a half-wavelength of said frequency or integral multiples thereof being iteratively terminated and each of the five loads being connected to a different one of the remaining five branching connections.

7. A network for connecting a source of wave energy of given frequency to five different loads with conjugacy therebetween, said network comprising a continuous transmission loop having an effective electrical length of two and one-half wavelengths of said frequency and ten branch connections to said loop at successive points separated by a quarter-wavelength of said frequency, alternate ones of said ten branching connections being each connected to a different one of said loads, said source of wave energy being connected to another of said branch connections and the four remaining branch connections being respectively iteratively terminated.

8. A broad frequency band balancing device comprising a chain of tandem-connected hybrid ring networks each consisting of a transmission line an odd number of half-wavelengths of a given frequency in electrical length, formed into a closed transmission loop and a plurality of branching connections to the loop, the last hybrid ring network in said chain having four loop branching connections such that alternate connections around the loop are conjugate to each other at said given frequency, each of the other hybrid ring networks having five loop branching connections such that a first and a second branching connection are each conjugate to a third branching connection and the fourth and fifth branching connections are conjugate to each other at said given frequency, two alternate branching connections of said last hybrid ring network in said chain being respectively connected in transmission relation with said first and said second loop branching connections of the next preceding hybrid ring network in said chain, the loop branching connection of said last hybrid ring network located between said two alternate loop branching connections thereof being iteratively terminated, said fourth and fifth loop branching connections of each of said other hybrid ring networks except the first one in said chain being respectively connected in transmission relation with said first and second loop branching connections of the next preceding hybrid ring network in said chain and said third loop branching connection of each of said other hybrid ring networks except the first in said chain being iteratively terminated, the differential combining effect of each of said hybrid ring networks except the first in said chain on the wave energy applied thereto from the next preceding hybrid ring network, when input wave energy is applied to said third loop branching connection of the first hybrid ring network in said chain, serving to broaden by a given amount the frequency band over which conjugacy is obtained between said fourth and fifth loop branching connections of said first network.

9. In combination, one or more hybrid rings each consisting of a closed transmission loop having an effective electrical length of one and one-half wavelengths of a given design frequency and five series branching connections to the loop at different points so spaced therearound that two of the loop branching connections are conjugate to a third loop branching connection and the fourth and fifth branching loop connections are conjugate to each other at said design frequency, another hybrid ring consisting of a closed transmission loop of the same electrical length as that of said one or more hybrid rings and four series branching connections to its loop at different points so spaced therearound that alternate branch connections are conjugate to each other at said design frequency, and means to connect the several hybrid rings in tandem through certain of their branching connections with said other hybrid ring serving as the last ring in the tandem combination, so as to effectively add the attenuations obtained between conjugate points of the several rings and to broaden the frequency band of effective conjugacy between said fourth and fifth branching loop connections of the first hybrid ring in the tandem combination when wave energy is applied to said third branching connection of said first hybrid ring.

10. A plurality of hybrid ring networks each consisting of a closed transmission loop and at least four branching connections thereto such as to provide high attenuation between each branching connection to which driving wave energy is applied and at least one other branching connection conjugate with respect thereto and means connecting said networks in tandem with the branching connections of each conjugate with respect to a driving branching connection of that network connected to the driving point connections of the succeeding network so as to effectively add the attenuation in the transmission paths connecting the driving branching connection of the first network in the tandem combination to a conjugate branching connection in the last network in the tandem combination.

11. In combination, a pair of hybrid ring networks each consisting of a closed transmission loop an odd number of half-wavelengths of a given frequency in effective electrical length and at least four branch connections to the loop such that at least one receiving branch connection is conjugate with respect to a driving branch connection at said given frequency and means for connecting each receiving branch connection of one of said hybrid ring networks in transmission relation to a different driving branch connection of the second network so as to make the total attenuation presented to wave energy of any frequency within a wide band extending to either side of said given frequency applied to a driving branch connection of said one network in passing to a receiving branch connection of said second network of high value.

12. A hybrid ring network consisting of a closed transmission loop effectively one and one-half wavelengths of a given design frequency in electrical length and five series branch arms to said loop at successive points a quarter-wavelength apart so that for a wave input to said loop through one of said branch arms, a second and a third branch arm respectively spaced a half wavelength therefrom will be in conjugate relation with respect to said one arm and the fourth and fifth arms respectively spaced a quarter-wavelength from said one arm will be in conjugate relation with respect to each other at that frequency, and means for broadening the frequency band over which said fourth and fifth branch arms will be conjugate comprising a second hybrid ring network consisting of a closed transmission loop one and one-half wavelengths of said design frequency in electrical length and four series branch arms to said loop at successive points a quarter-wavelength apart, the said second and third branch arms of the first hybrid ring network being respectively connected in wave transmission relation with two non-adjacent branch arms a half-wavelength apart of said second hybrid bridge network and the branch arm intermediate said two non-adjacent branch arms of said second network being iteratively terminated, so that the oppositely phased wave outputs appearing in said second and third branch arms of said first network, due to the half-wavelength separation between them, when the frequency of the wave input to said one arm thereof varies from the design frequency, will be effectively balanced out by the differential combining effect of said second hybrid ring network over said frequency band.

13. A broad-frequency band balancing device comprising one hybrid ring network consisting of a closed transmission loop having an effective electrical length of one and one-half wavelengths of a given design frequency and four transmission branch arms respectively connected in series with that loop at successive points spaced apart by a quarter-wavelength, and a second hybrid ring network consisting of a closed transmission loop having an effective electrical length of one and one-half wavelengths of said frequency and five transmission branch arms respectively connected in series with that loop at successive points spaced apart by a quarter-wavelength, the two hybrid ring networks being connected effectively in tandem by direct connections between the pair of adjacent branch arms in said second network separated by a half-wavelength and a pair of non-adjacent branch arms of said one network also separated by a half-wavelength, the other two non-adjacent branch arms of said second network being respectively connected to different loads, and the third branch arm of said one network intermediate said pair of non-adjacent branch arms being iteratively terminated, the resultant isolation of the fourth branch of said one network from the fifth branch arm of said second network due to the differential combining effect of said one network causing said other two non-adjacent branch arms of said second network leading to said different loads to be isolated over a band of frequencies extending to either side of said given design frequency.

14. A device for dividing wave power supplied from a single source between two loads while maintaining the two loads isolated over a given frequency range of the supplied wave power comprising a hybrid ring network consisting of a closed transmission loop one and one-half wavelengths of an intermediate frequency in said frequency range in electrical length and four series branch arms to said loop at successive points a quarter-wavelength apart, a second hybrid ring network consisting of a second closed transmission loop surrounding the closed loop of the first hybrid ring network and having an effective electrical length of one and one-half wavelengths of said intermediate frequency multiplied by three or a higher odd integer and five series branch arms to that loop at successive points spaced apart by a quarter-wavelength multiplied by the same odd integer, the two adjacent arms of said second hybrid ring network which are a half-wavelength multiplied by said odd integer apart being connected in transmission relation with two non-adjacent arms of the first hybrid ring network which are a half-wavelength apart, said source of wave power being connected to the loop of said second network through a third branch arm thereof in conjugate relation with each of said two adjacent arms, the branch arm of said first network located between said two non-adjacent branch arms of said first network being terminated in its characteristic impedance, said two loads being respectively connected to the fourth and fifth arm of said second hybrid ring network, and being maintained effectively isolated from each other due to the differential combining effect of said four-arm hybrid ring network on the wave outputs appearing in said two adjacent branch arms of said second hybrid ring network a half-wavelength apart multiplied by said odd integer, when the frequency of the wave input to said third branch arm of said second network varies within said given frequency range.

References Cited in the file of this patent

UNITED STATES PATENTS

| | | |
|---|---|---|
| 2,147,809 | Alford | Feb. 21, 1939 |
| 2,190,131 | Alford | Feb. 13, 1940 |
| 2,445,895 | Tyrrell | July 27, 1948 |